United States Patent
Spitaels et al.

(10) Patent No.: US 8,476,787 B2
(45) Date of Patent: Jul. 2, 2013

(54) SYSTEM AND METHOD FOR CHANGING POWER STATES OF A POWER DEVICE

(75) Inventors: James S. Spitaels, Shrewsbury, MA (US); Vishwas Mohaniraj Deokar, Acton, MA (US); Kyle Brookshire, Belmont, MA (US); Fred William Rodenhiser, Wilmington, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 0 days.

(21) Appl. No.: 12/412,820

(22) Filed: Mar. 27, 2009

(65) Prior Publication Data
US 2010/0244571 A1    Sep. 30, 2010

(51) Int. Cl.
*H02J 9/00*    (2006.01)

(52) U.S. Cl.
USPC .............................. 307/64; 707/600

(58) Field of Classification Search
USPC .............................. 307/64; 707/600
See application file for complete search history.

(56) References Cited

U.S. PATENT DOCUMENTS

| | | | |
|---|---|---|---|
| 4,217,645 A | 8/1980 | Barry et al. | |
| 4,394,741 A | 7/1983 | Lowndes | |
| 4,564,767 A | 1/1986 | Charych | |
| 4,611,289 A | 9/1986 | Coppola | |
| 4,692,632 A | 9/1987 | Gaul et al. | |
| 4,782,241 A | 11/1988 | Baker et al. | |
| 5,019,717 A | 5/1991 | McCurry et al. | |
| 5,126,585 A | 6/1992 | Boys | |
| 5,170,124 A | 12/1992 | Blair et al. | |
| 5,184,025 A | 2/1993 | McCurry et al. | |
| 5,291,383 A | 3/1994 | Oughton | |
| 5,315,533 A | 5/1994 | Stich et al. | |
| 5,319,571 A | 6/1994 | Langer et al. | |
| 5,321,626 A | 6/1994 | Palladino | |
| 5,321,627 A | 6/1994 | Reher | |
| 5,325,041 A | 6/1994 | Briggs | |
| 5,381,554 A | 1/1995 | Langer et al. | |
| 5,455,499 A | 10/1995 | Uskali et al. | |
| 5,458,991 A | 10/1995 | Severinsky | |
| 5,534,734 A * | 7/1996 | Pugh et al. ..................... | 307/38 |
| 5,579,197 A | 11/1996 | Mengelt et al. | |
| 5,602,462 A | 2/1997 | Stich et al. | |
| 5,664,202 A | 9/1997 | Chen et al. | |
| 5,666,040 A | 9/1997 | Bourbeau | |
| 5,793,124 A * | 8/1998 | Mitzaki ......................... | 307/66 |
| 5,793,627 A | 8/1998 | Caldes et al. | |
| 5,794,031 A * | 8/1998 | Nakadai ......................... | 713/2 |
| 5,886,890 A | 3/1999 | Ishida et al. | |
| 5,923,099 A | 7/1999 | Bilir | |
| 6,031,354 A | 2/2000 | Wiley et al. | |
| 6,119,228 A * | 9/2000 | Angelo et al. ................ | 713/180 |
| 6,122,663 A * | 9/2000 | Lin et al. ....................... | 709/224 |

(Continued)

*Primary Examiner* — Adi Amrany
(74) *Attorney, Agent, or Firm* — Lando & Anastasi, LLP (57) ABSTRACT

Aspects in accord with the present invention are directed to a system or method for changing power states of an uninterruptible power supply. In one aspect, the present invention features a method of monitoring a power state of a power device. The method may comprise receiving from one of a plurality of sources a request to change the power state of the power device, initiating a change of power state based on the request, logging an identity of the one of the plurality of sources requesting the change of power state, a type of change of power state, and a time of change of power state, and communicating through a user interface the identity of the one of the plurality of sources requesting the change.

46 Claims, 4 Drawing Sheets

U.S. PATENT DOCUMENTS

| | | | |
|---|---|---|---|
| 6,170,007 B1 | 1/2001 | Venkatraman et al. | |
| 6,175,511 B1 | 1/2001 | Ooba | |
| 6,175,927 B1 * | 1/2001 | Cromer et al. | 713/300 |
| 6,184,593 B1 | 2/2001 | Jungreis | |
| 6,201,319 B1 | 3/2001 | Simonelli et al. | |
| 6,201,371 B1 | 3/2001 | Kawabe et al. | |
| 6,204,574 B1 | 3/2001 | Chi | |
| 6,268,711 B1 | 7/2001 | Bearfield | |
| 6,274,950 B1 | 8/2001 | Gottlieb et al. | |
| 6,285,178 B1 | 9/2001 | Ball et al. | |
| 6,301,674 B1 | 10/2001 | Saito et al. | |
| 6,329,792 B1 | 12/2001 | Dunn et al. | |
| 6,408,334 B1 * | 6/2002 | Bassman et al. | 709/223 |
| 6,433,444 B1 | 8/2002 | de Vries | |
| 6,465,910 B2 | 10/2002 | Young et al. | |
| 6,469,471 B1 | 10/2002 | Anbuky et al. | |
| 6,493,243 B1 | 12/2002 | Real | |
| 6,549,014 B1 | 4/2003 | Kutkut et al. | |
| 6,584,329 B1 | 6/2003 | Wendelrup et al. | |
| 6,598,170 B1 * | 7/2003 | Nagashima | 713/340 |
| 6,700,351 B2 | 3/2004 | Blair et al. | |
| 6,784,641 B2 | 8/2004 | Sakai et al. | |
| 6,795,322 B2 | 9/2004 | Aihara et al. | |
| 6,854,065 B2 | 2/2005 | Smith et al. | |
| 6,865,685 B2 * | 3/2005 | Hammond et al. | 713/340 |
| 6,894,622 B2 | 5/2005 | Germagian et al. | |
| 6,904,458 B1 * | 6/2005 | Bishop et al. | 709/223 |
| 6,922,347 B2 | 7/2005 | Lanni | |
| 6,923,676 B2 | 8/2005 | Perry | |
| 6,959,392 B1 * | 10/2005 | Yamamoto et al. | 726/5 |
| 6,983,212 B2 | 1/2006 | Burns | |
| 7,015,599 B2 | 3/2006 | Gull et al. | |
| 7,050,312 B2 | 5/2006 | Tracy et al. | |
| 7,057,308 B2 | 6/2006 | Stranberg et al. | |
| 7,082,541 B2 | 7/2006 | Hammond et al. | |
| 7,132,833 B2 | 11/2006 | Layden et al. | |
| 7,141,891 B2 | 11/2006 | McNally et al. | |
| 7,142,950 B2 | 11/2006 | Rasmussen et al. | |
| 7,202,576 B1 | 4/2007 | Dechene et al. | |
| 7,242,111 B2 | 7/2007 | Menas et al. | |
| 7,259,477 B2 | 8/2007 | Klikic et al. | |
| 7,274,112 B2 | 9/2007 | Hjort et al. | |
| 7,275,169 B2 * | 9/2007 | Aharonian et al. | 713/330 |
| 7,301,249 B2 | 11/2007 | Stranberg et al. | |
| 7,350,088 B2 * | 3/2008 | Allison et al. | 713/300 |
| 7,352,083 B2 | 4/2008 | Nielsen et al. | |
| 7,402,921 B2 | 7/2008 | Ingemi et al. | |
| 7,432,615 B2 | 10/2008 | Hjort | |
| 7,446,433 B2 | 11/2008 | Masciarelli et al. | |
| 7,456,518 B2 | 11/2008 | Hjort et al. | |
| 7,516,362 B2 * | 4/2009 | Connelly et al. | 714/26 |
| 7,521,823 B2 | 4/2009 | Klikic et al. | |
| 7,608,944 B2 | 10/2009 | Stranberg et al. | |
| 7,615,890 B2 | 11/2009 | Masciarelli et al. | |
| 7,615,891 B2 | 11/2009 | Wu et al. | |
| 7,703,046 B2 * | 4/2010 | Fallon et al. | 715/861 |
| 2001/0005894 A1 | 6/2001 | Fukui | |
| 2001/0033502 A1 | 10/2001 | Blair et al. | |
| 2001/0034735 A1 | 10/2001 | Sugiyama | |
| 2002/0129355 A1 * | 9/2002 | Velten et al. | 717/176 |
| 2002/0130556 A1 | 9/2002 | Hohri | |
| 2002/0136042 A1 | 9/2002 | Layden et al. | |
| 2002/0136939 A1 | 9/2002 | Grieve et al. | |
| 2002/0138785 A1 | 9/2002 | Hammond et al. | |
| 2002/0184361 A1 * | 12/2002 | Eden | 709/224 |
| 2003/0011647 A1 * | 1/2003 | Abbondanzio et al. | 345/853 |
| 2003/0033550 A1 * | 2/2003 | Kuiawa et al. | 713/340 |
| 2003/0048006 A1 | 3/2003 | Shelter, Jr. et al. | |
| 2003/0062775 A1 | 4/2003 | Sinha | |
| 2003/0076696 A1 | 4/2003 | Tsai | |
| 2003/0114963 A1 | 6/2003 | Walker | |
| 2004/0036361 A1 | 2/2004 | Dai et al. | |
| 2004/0104706 A1 | 6/2004 | Ooi et al. | |
| 2005/0029984 A1 | 2/2005 | Cheng et al. | |
| 2005/0071093 A1 | 3/2005 | Stefan | |
| 2005/0071699 A1 | 3/2005 | Hammond et al. | |
| 2005/0162129 A1 | 7/2005 | Mutabdzija et al. | |
| 2005/0201127 A1 | 9/2005 | Tracy et al. | |
| 2005/0227519 A1 | 10/2005 | Perry | |
| 2005/0239546 A1 * | 10/2005 | Hedrick et al. | 463/29 |
| 2006/0192436 A1 | 8/2006 | Stranberg et al. | |
| 2006/0238941 A1 | 10/2006 | Ingemi et al. | |
| 2006/0252529 A1 * | 11/2006 | Hedrick et al. | 463/29 |
| 2007/0055409 A1 | 3/2007 | Rasmussen et al. | |
| 2007/0064363 A1 | 3/2007 | Nielsen et al. | |
| 2007/0216229 A1 | 9/2007 | Johnson, Jr. et al. | |
| 2008/0042491 A1 | 2/2008 | Klikic et al. | |
| 2008/0051195 A1 * | 2/2008 | Hedrick et al. | 463/29 |
| 2008/0157602 A1 | 7/2008 | Stranberg et al. | |
| 2008/0201595 A1 * | 8/2008 | Kawasaki | 713/330 |
| 2008/0231118 A1 * | 9/2008 | Roepke | 307/64 |
| 2009/0160254 A1 | 6/2009 | Wu et al. | |
| 2009/0201703 A1 | 8/2009 | Klikic et al. | |
| 2009/0231892 A1 | 9/2009 | Klikic et al. | |
| 2009/0251002 A1 | 10/2009 | Cohen et al. | |
| 2010/0049457 A1 | 2/2010 | Mutabdzija et al. | |
| 2010/0201194 A1 | 8/2010 | Masciarelli et al. | |

* cited by examiner

SYSTEM AND METHOD FOR CHANGING POWER STATES OF A POWER DEVICE

BACKGROUND

1. Field of the Invention

At least one example in accordance with the present invention relates generally to systems and methods for providing power and more specifically to control systems and methods for changing power states in power devices.

2. Discussion of Related Art

The use of power devices, such as uninterruptible power supplies (UPS), to provide regulated, uninterrupted power for sensitive and/or critical loads, such as computer systems and other data processing systems, is known. A number of different UPS products are available including those identified under the trade name SMART-UPS from American Power Conversion Corporation of West Kingston R.I. In a typical UPS, a battery is used to provide backup power for a critical load during blackout or brownout conditions. A user of a typical UPS is able to configure and control the UPS either through a computer coupled to the UPS or using through a user interface of the UPS itself.

SUMMARY OF THE INVENTION

Aspects in accord with the present invention are directed to a system or method for changing power states of a power device.

In one aspect, the present invention features a method of monitoring a power state of a UPS. The method may comprise receiving from one of a plurality of sources a request to change the power state of the UPS, initiating a change of power state based on the request, logging an identity of the one of the plurality of sources requesting the change of power state, a type of change of power state, and a time of change of power state, and communicating through a user interface the identity of the one of the plurality of sources requesting the change.

According to one embodiment, initiating the change of power state may include communicating through the user interface the request to change the power state and the identity of the one of the plurality of sources requesting the change of power state.

According to one embodiment, initiating the change of power state may include initiating a shutdown of an outlet of the UPS. According to another embodiment, initiating the change of power state may include initiating a powering off of the UPS. According to another embodiment, initiating the change of power state may include initiating a sleep mode of the UPS. According to another embodiment, initiating the change of power state may include initiating a reboot of the UPS. According to another embodiment, initiating the change of power state may include initiating a reboot of an outlet of the UPS. According to another embodiment, initiating the change of power state may include initiating a gradual shutdown of loads attached to the UPS.

According to one embodiment, the method may further comprise communicating through the user interface the type of change of power state. According to another embodiment, the method may further comprise communicating through the user interface the time of change of power state.

According to one embodiment, the method may further comprise communicating a warning to a load impacted by the change of power state.

According to one embodiment, initiating the change of power state may include powering off at least one group of outlets of the UPS after a first time period has elapsed, and powering off the UPS after a second time period has elapsed.

In another aspect, the present invention features an uninterruptible power supply. The uninterruptible power supply may comprise a housing, a first input to receive power from a first power source, a second input to receive power from a second power source, an output operatively coupled to the first input and the second input and configured to provide power, a user interface disposed within the housing, and a controller coupled to the user interface. The controller may be configured to receive from one of a plurality of sources a request to change the power state of the UPS, initiate a change of power state based on the request, log an identity of the one of the plurality of sources requesting the change of power state, a type of change of power state, and a time of change of power state, and communicate through the user interface the identity of the one of the plurality of sources requesting the change.

According to one embodiment, in initiating the change of power state based on the request, the controller may be further configured to communicate through the user interface the request to change the power state and the identity of the one of the plurality of sources requesting the change of power state.

According to one embodiment, in initiating the change of power state, the controller may be further configured to initiate a shutdown of an outlet of the UPS. According to another embodiment, in initiating the change of power state, the controller may be further configured to initiate a powering off of the UPS. According to another embodiment, in initiating the change of power state, the controller may be further configured to initiate a sleep mode of the UPS. According to another embodiment, in initiating the change of power state, the controller may be further configured to initiate a reboot of the UPS. According to another embodiment, in initiating the change of power state, the controller may be further configured to initiate a reboot of an outlet of the UPS. According to another embodiment, in initiating the change of power state, the controller may be further configured to initiate a gradual shutdown of loads attached to the UPS.

According to one embodiment, the controller may be further configured to communicate through the user interface the type of change of power state. According to another embodiment, the controller may be further configured to communicate through the user interface the time of change of power state.

According to one embodiment, the controller may be further configured to communicate a warning to a load impacted by the change of power state.

According to one embodiment, in initiating the change of power state, the controller may be further configured to power off at least one group of outlets of the UPS after a first time period has elapsed, and power off the UPS after a second time period has elapsed.

According to one embodiment, the second power source may be a battery included in the UPS.

In another aspect, the present invention features an uninterruptible power supply. The uninterruptible power supply may comprise a housing, a first input to receive power from a first power source, a second input to receive power from a second power source, an output operatively coupled to the first input and the second input and configured to provide power, and a means for identifying a source of a request to change the power state of the UPS.

According to one embodiment, the means for identifying the source of the request to change the power state may include means for communicating an identity of the source of the request to change the power state of the UPS. According to another embodiment, the means for identifying the source of the request to change the power state may include means for logging an identity of the source of the request to change the power state of the UPS.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

At least some examples in accordance with the present invention relate to systems and processes for providing improved control, monitoring and/or configuration of uninterruptible power supplies.

The aspects disclosed herein in accordance with the present invention, are not limited in their application to the details of construction and the arrangement of components set forth in the following description or illustrated in the drawings. These aspects are capable of assuming other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Figure 1:
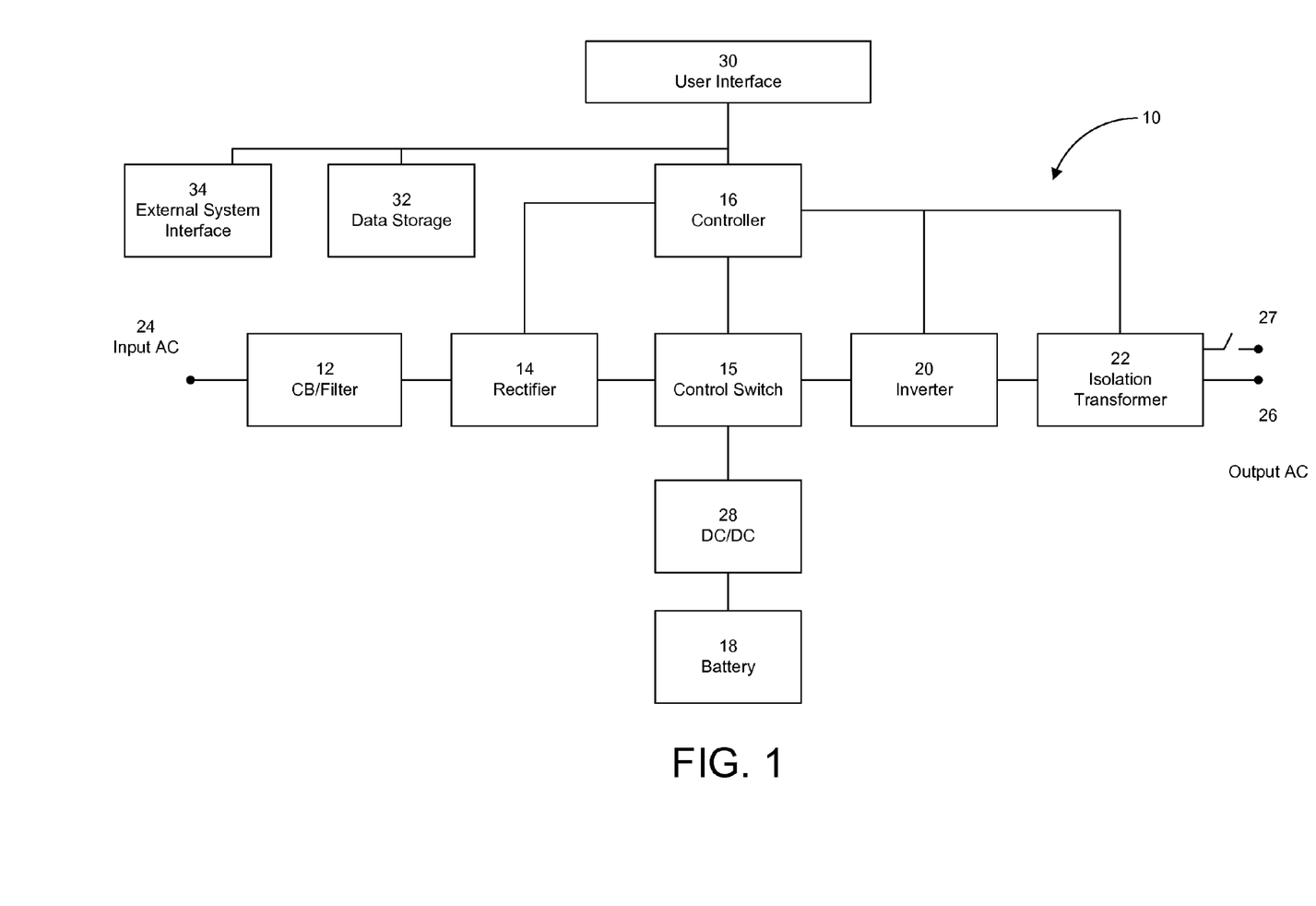
FIG. 1 is an example block diagram of a UPS in accordance with the present invention.

FIG. 1 shows an on-line UPS 10 used to provide regulated, uninterrupted power in accordance with one example of the invention. In one example, the UPS 10 is included in a Power Distribution Unit (PDU) which may be a floor-mount PDU or a rack-mount PDU. The UPS 10 includes an input circuit breaker/filter 12, a rectifier 14, a control switch 15, a controller 16, a battery 18, an inverter 20, an isolation transformer 22, a DC/DC converter 28, an interface 30, data storage 32 and external system interface 34. The UPS 10 also includes an input 24 for coupling to an AC power source, and at least one outlet 26 for coupling to a load. In one example, the outlet 26 may be an unswitched outlet. An unswitched outlet provides power when the UPS 10 is on and does not provide power when the UPS 10 is off. In another example, the UPS 10 may also include at least one switched outlet 27 capable of being operated by the controller 16. A switched outlet is capable of being turned off when the UPS 10 is still on. Additionally, in another example, the UPS 10 may further include a plurality of outlets configured to be controlled together as an outlet group. The outlets in the outlet group are turned on and off together. A UPS may have multiple outlet groups.

As shown in FIG. 1, the interface 30 may be a user interface. In one example, the user interface 30 is an alphanumeric user interface. In another example, the UPS 10 exposes the interface functionality discussed herein through the external system interface 34. In this example, the UPS 10 provides an interface application program interface (API) that includes a set of standards for invoking the interface functionality of the UPS 10. The specific interface functions that may be invoked using the interface API include any interface functionality provide by the UPS 10. Thus, using an external system that is configured to interact with the UPS 10 via the interface API, the user can, for example, shutdown the UPS 10, retrieve or store values for specific operational parameters in the data storage 32, or display information on the interface display 50 or on the external system.

It should be appreciated that even though examples in accordance with the present invention are described herein for use with an on-line UPS, some examples may be used with other UPS topologies including off-line and line interactive UPS's. Further, at least some examples described herein may be used with power devices other than UPS's including, but not limited to, outlet strips, power converters, line conditioners, surge protectors, power conditioners, Power Distribution Units (PDU) and Rack PDUs.

The UPS 10, as shown in FIG. 1, operates as follows. The circuit breaker/filter 12 receives input AC power from the AC power source through the input 24, filters the input AC power and provides filtered AC power to the rectifier 14. The rectifier 14 rectifies the input voltage. The DC/DC converter 28 regulates DC power from the battery 18. The control switch 15 receives the rectified power and also receives the DC power from the DC/DC converter 28. The controller 16 determines whether the power available from the rectifier 14 is within predetermined tolerances, and if so, controls the control switch 15 to provide the power from the rectifier 14 to the inverter 20. If the power from the rectifier 14 is not within the predetermined tolerances, which may occur because of "brown out" or "black out" conditions, or due to power surges, then the controller 16 controls the control switch 15 to provide the DC power from the DC/DC Converter 28 to the inverter 20.

In an alternative example, the battery 18 is coupled to the rectifier circuit and the rectifier 14 functions as a boost converter in on-line mode of operation and on-battery mode of operation as described in U.S. Pat. No. 7,402,921, entitled "Method and Apparatus For Providing Uninterruptible Power," issued Jul. 22, 2008, which is hereby incorporated herein by reference in its entirety.

The inverter 20 of the UPS 10 receives DC power and converts the DC power to AC power and regulates the AC power to predetermined specifications. The inverter 20 provides the regulated AC power to the isolation transformer 22. The isolation transformer 22 is used to increase or decrease the voltage of the AC power from the inverter 20 and to provide isolation between a load and the UPS 10. The isolation transformer 22 is an optional device, the use of which is dependent on UPS output power specifications. Depending on the capacity of the battery 18 and the power requirements of the load, the UPS 10 can provide power to the load during brief power source dropouts or for extended power outages.

Using data stored in associated memory, the controller 16 performs one or more instructions that may result in manipulated data, and the controller 16 monitors and controls operation of the UPS 10. In some examples, the controller 16 may include one or more processors or other types of controllers. In one example, the controller 16 is a commercially available, general purpose processor. In another example, the controller 16 performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

The data storage 32 stores computer readable and writable information required for the operation of the UPS 10. This information may include, among other data, data subject to manipulation by the controller 16 and instructions that are executable by the controller 16 to manipulate data. The data storage 32 may be a relatively high performance, volatile, random access memory such as a dynamic random access memory (DRAM) or static memory (SRAM) or may be a nonvolatile storage media such as magnetic disk or flash memory. In one example, the data storage 32 includes both volatile and non-volatile storage. Various examples in accord with the present invention can organize the data storage 32 into particularized and, in some cases, unique structures to perform the aspects and functions disclosed herein. In addition, these data structures may be specifically configured to conserve storage space or increase data exchange performance.

The external system interface 34 exchanges data with one or more external devices. These external devices may include any device configured to communicate using standards and protocols supported by the UPS 10. Examples of specific standards and protocols that the external system interface 34 may support include parallel, serial, and USB interfaces. Other examples of these supported protocols and standards include networking technologies such as UDP, TCP/IP and Ethernet technologies. In at least some examples, the external system interface includes a network management card (NMC) and a USB interface.

Figure 2:
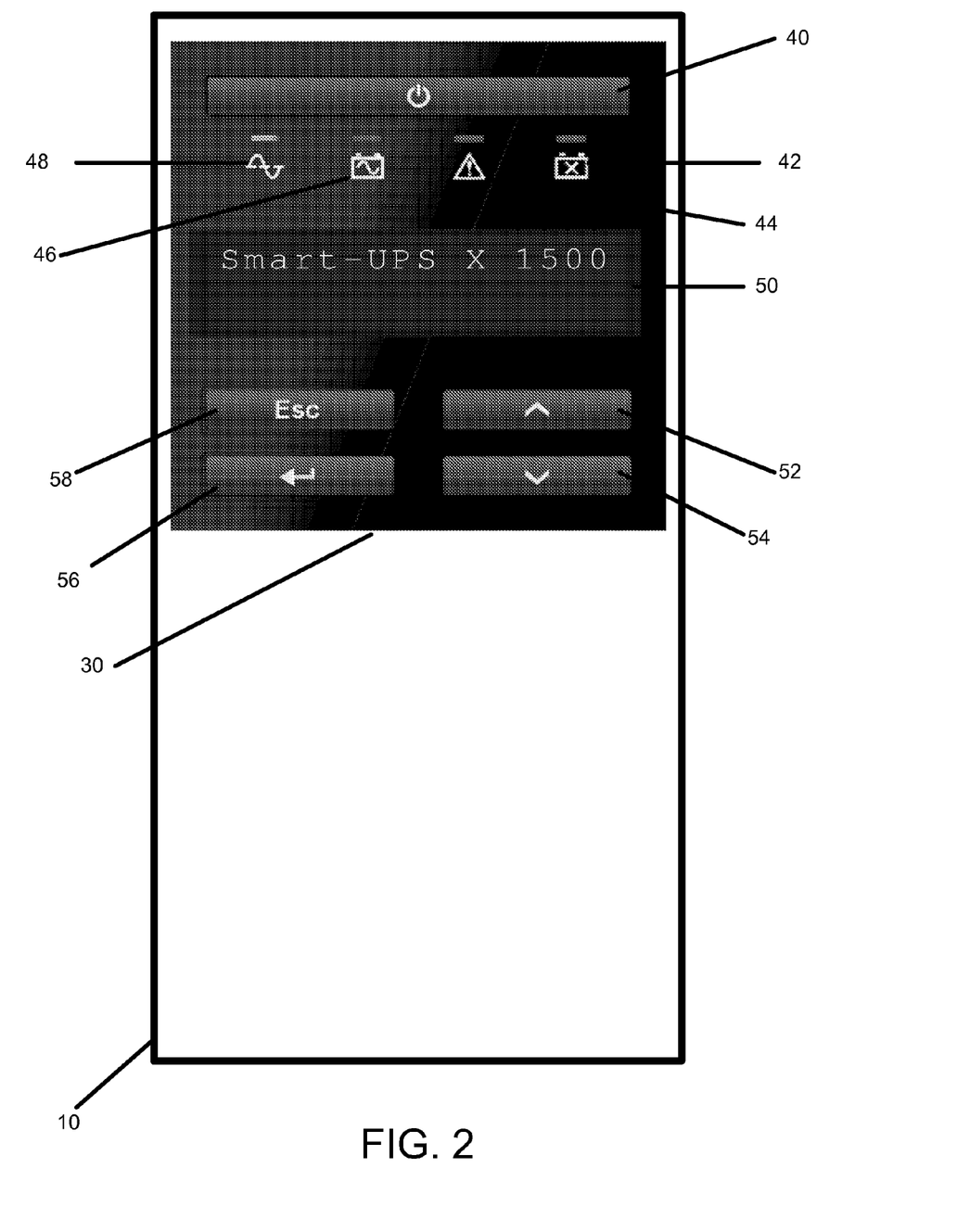
FIG. 2 illustrates an example of a user interface including a display that is housed in a UPS in accordance with the present invention.

The user interface 30 includes a display screen and a set of keys through which a user of the UPS 10 can monitor, control and configure operation of the UPS 10. FIG. 2 depicts an external view of the UPS 10 including the user interface 30. The user interface 30 includes a power button 40, a replace battery indicator 42, a warning indicator 44, an on-battery power indicator 46, an on-line power indicator 48, an interface display 50, a scroll up button 52, a scroll down button 54, an enter button 56 and an escape button 58.

The user interface 30 functions as follows. The power button 40, when actuated, will cause the UPS 10 to toggle between power-on and power-off states. According to some examples, the UPS 10 performs a series of accompanying actions to better manage these power state transitions.

The set of indicators 42, 44, 46 and 48 provide various information regarding current and prior states of the UPS 10. For example, the UPS 10 may determine by running a self-test, that the battery 18 needs to be replaced. In this instance, the UPS 10 illuminates the replace battery indicator 42 to communicate this need.

The on-line power indicator 48 and the on-battery power indicator 46 signal the current source of power to the load. An active on-line power indicator 48 signals that the UPS 10 is providing power to the load in a normal operating fashion, i.e. the source of the power is the AC received through input 24. Conversely, an active on-battery power indicator 46 signals that the source of the power to the load is battery 18.

In another example, the UPS 10 may determine, for a variety of reasons, that the attention of a user is needed. The reasons may include, among others, detection that the battery 18 is disconnected or that the battery 18 has been depleted by the load. In this case, the UPS 10 signals the need for user attention by activating the warning indicator 44. In addition, the UPS 10 may provide a description of the reason for the warning in the interface display 50.

The interface display 50, which can be fashioned by a variety of hardware components including Liquid Crystal Displays and Light Emitting Diodes, presents a wide variety of information to a user. This information may include monitoring information, such as the status warnings discussed above. In addition, this information may include configuration information and prompts through which the UPS 10 collects information from the user. Together, the interface display 50 and buttons 52, 54, 56 and 58 provide the UPS 10 with more flexibility in exchanging information with the user than is available using conventional UPS technology.

In one example, UPS 10 includes an interface structure that can be navigated by the user using the interface display 50 and buttons 52, 54, 56 and 58. This interface structure may include a variety of elements related to one another in various ways. For example, the interface structure may be a hierarchical menu structure. The behavior initiated by actuation of the buttons 52, 54, 56 and 58 is dependent upon the current location of the user in the interface structure, as is the information displayed in the interface display 50.

For example, the current location of the user may be an intermediate location within the interface structure, i.e. the current location connects to other elements of the interface structure. In this situation, the interface display 50 displays one of a list of the other elements of the interface structure connected to the user's current location and the buttons 52, 54, 56 and 58 are configured to provide navigational functions. In this mode, the user can move through, and cause the interface display 50 to display each element of, the list of the elements of the interface structure that are connected to the current location. More precisely, the user can move up the list by actuating the scroll up button 52 and down the list by actuating the scroll down button 54. Furthermore, the user can navigate to the element of the interface structure currently displayed in interface 50 by actuating the enter button 56. Conversely, the user can navigate to the user's previous location in the interface structure by actuating the escape button 58.

In another example, the current location of the user in the interface structure may cause the UPS 10 to display review information to the user via the interface display 50. This review information may be any information stored within the UPS 10 and may include, among other information, configuration information, operational information and information regarding other devices in communication with the UPS 10, such as devices to which the UPS 10 supplies power. In one example, the interface display 50 displays an element belonging to a list of review information and the buttons 52, 54, 56 and 58 are configured to provide review functions. Under this configuration, the user can move through, and cause the interface display 50 to display each element of the list of review information. More specifically, and much like the navigational mode discussed above, the user can navigate up or down the list of review information by actuating the scroll up button 52 or the scroll down button 54. Furthermore, the user can navigate to the user's previous location in the interface structure by actuating the escape button 58. In at least some examples, actuation of the enter button 56, while in this mode, results in an error message explaining that the other keys are the valid keys at the user's current location within the interface structure.

According to another example, the current location of the user in the interface structure may cause the UPS 10 to prompt the user for information through the interface display 50. The information prompted for may be any information stored within the UPS 10 and may include, among other information, configuration information, information regarding the source of power into the UPS 10 and information regarding other devices in communication with the UPS 10, such as devices to which the UPS 10 supplies power. In this instance, the interface display 50 displays a prompt for information and the buttons 52, 54, 56 and 58 are configured to provide data entry functions. In this situation, the user can adjust the information displayed in the interface display 50 and enter answers to the prompts. More specifically, the user can change the answer to the prompt using the scroll up button 52 or the scroll down button 54. For example, a user can toggle a Boolean value from true to false or from yes to no, by actuating either of buttons 52 or 54. In another example, the user can increase or decrease a numerical answer displayed in the prompt by actuating the scroll up button 52 or the scroll down button 54. In still another example, the user can scroll up or down a list of answers using the scroll up button 52 or the scroll down button 54. In addition, the user can enter the currently displayed answer for the prompt by actuating the enter button 56. The user can also exit the prompt without saving the currently displayed answer by actuating the escape key 58. Thus, the particular arrangement and function of the user interface 30 provides users with sundry advantages over conventional UPS interfaces.

The user interface shown in FIG. 2 may be implemented in other examples using different configurations of buttons, different styles of buttons and using display screens of different sizes. For example, in one example the interface display 50 is a touch screen interface upon which the buttons are rendered for user input. In this example, the sizes, colors and arrangement of the buttons may be altered based on a number of factors including, among others, the level of expertise of the user, the availability of the buttons to accept input and the current status of the UPS. Thus examples of the invention allow the UPS interface to be tailored to the requirements of a variety of users.

Figure 3:
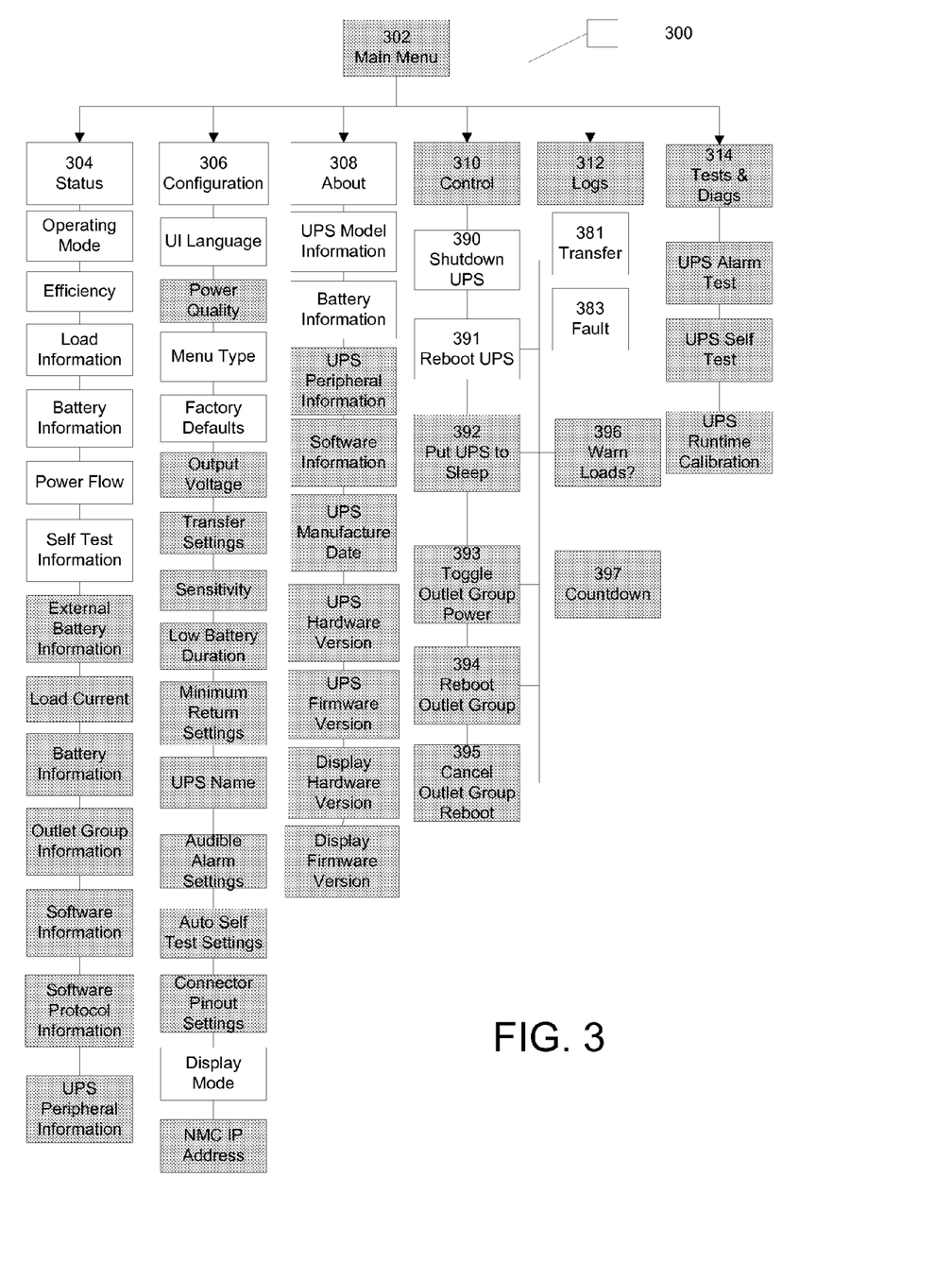
FIG. 3 shows an example of a user interface structure in accordance with the present invention.

FIG. 3 illustrates one example of a user interface structure 300 in accordance with the present invention. In the illustrated example, the main menu 302 provides access to screens 304, 306, 308, 310, 312 and 314.

The status screen 304 provides access to various screens that display a variety of information regarding the status of the UPS 10. The configuration screen 306 provides access to several screens that allow a user to configure a variety of parameters that control the operation of the UPS 10. The about screen 308 allows users to access a variety of screens that display information concerning components of UPS 10. The control screen 310 provides users with access to screens that control the operation of the UPS 10. The logs screen 312 provides access to logged event information. The test and diagnostics screen 314 provides access to screens that allow a user to verify that the UPS 10 is in proper operational condition.

The various screens depicted in FIG. 3 function as follows. From the main menu screen 302, a user can move through any of screens 304, 306, 308, 310, 312 and 314 that are active by actuating the scroll up button 52 and the scroll down button 54. In addition, a user can change position in the interface structure 300 to one of screens 304, 306, 308, 310, 312 and 314 by actuating the enter button 56 while the desired screen is displayed.

In the example shown in FIG. 3, each of screens 304, 306, 308, 310, 312 and 314 allow a user to navigate to the screens positioned beneath them in the interface structure 300. For example, a user currently positioned at the control screen 310 can move through any of screens 390, 391, 392, 393, 394, and 395 that are active by actuating the scroll up button 52 and the scroll down button 54. Furthermore, a user can change position in the interface structure 300 to any of screens 390, 391, 392, 393, 394, and 395 that are active by actuating the enter button 56 while the desired screen is displayed. Also, from the control screen 310, the user can move one level up in the interface structure 300, i.e. to the main menu screen 302, by actuating the escape key 58. Each of screens 304, 306, 308, 312 and 314 provide analogous navigation of the active screens positioned beneath them in the interface structure 300.

Continuing the example shown in FIG. 3, the screens that are accessible via the control screen 310 allow the user to change the operational state of the UPS 10. In this example, the user can navigate to a particular control screen by using the scroll up button 52 and the scroll down button 54. The user may change position in the interface structure 300 to the currently displayed control screen by actuating the enter button 56. Once positioned at a particular control screen, the user may cause the UPS 10 to perform an action associated with the screen by again actuating the enter button 56. In response, the UPS 10 performs the confirmed action. Conversely, when positioned at a particular control screen, the user may abort the action and return to the control screen 310 by actuating the escape button 56.

In the example shown in FIG. 3, the control screens that are accessible via the control screen 310 provide access to a variety of actions that change the operational state of the UPS 10. Operational states may include, but are not limited to, power states such as a power on state, a power off state, a reboot state, a sleep state, an outlet reboot state, or an outlet shutdown state. For example, the turn UPS off screen 390 allows the user to initiate a powering down of the UPS 10. The reboot UPS screen 391 allows the user to initiate a power cycling of the UPS 10. The put UPS to sleep screen 392 allows the user to cause the UPS 10 to enter a reduced power consumption mode in which the UPS 10 adjusts the power made available to the load in proportion to the power demanded by the load. The toggle outlet group power screen 393 gives the user the ability to turn power supplied to particular outlet groups on or off. The reboot outlet group screen 394 provides the user with the ability to cycle the power to particular outlet groups. The cancel outlet group reboot 395 provides the user with the ability to cancel a reboot of a particular outlet group.

A request to change states of the UPS 10 according to any of control screens 390 to 395 may be made by a variety of sources including, but not limited to, a user through the user interface 30, preprogrammed software in the controller 16, software from an external device connected to the external system interface 34, a NMC connected to the external system interface 34, and a server including an NMC, software or some other entity connected to the external system interface 34 and configured to send control signals to the UPS 10. Responsive to a request to change states of the UPS 10, the source of the request is stored in data storage 32.

In one example, a request to turn off an outlet group is made by a source responsive to a determination that the UPS 10 can no longer support its required load. Responsive to a determination that the UPS 10 can no longer support its required load, a source may request that the UPS 10 shed (shutdown) certain loads or outlets to make enough power available to the remaining loads. In one example, loads may be assigned priorities and the lower priority loads will be shutdown first resulting in additional power becoming available for the higher priority loads. In another example, responsive to a determination that the UPS is again able to support its entire required load, the previously shutdown loads are powered up. The source of the requests to shed loads and to repower the shed loads is stored.

Each of screens 390, 391, 392, 393, 394 and 395 allow the user to effect changes in the operational state of the UPS 10 that affect the load. The warn loads screen 396, which is displayed by the UPS 10 after confirmation of a request facilitated by any of screens 390-395, allows the user to cause the UPS 10 to notify the elements of the load of the imminent operational state change. Also, in one example, during the powering off of the UPS 10, the different outlet groups may be turned off gradually before the entire UPS 10 is turned off. For example, when a request is made to turn off the UPS 10, a first outlet group may be turned off first, followed by a second outlet group and finally the entire UPS 10.

The countdown screen 397 displays a timed countdown until each element of the requested operational state change is completed by the UPS 10. For example, responsive to different outlet groups being shut down gradually, a timed countdown will occur individually for the powering down of each group and a final timed countdown will occur for the complete shutdown of the UPS 10.

In one example, before the timed countdown is displayed, the countdown screen 396 may also display information regarding the source and manner of the request to change states of the UPS 10. For example, if a request to turn off an outlet group is made by software in an attempt to shed loads, before the timed countdowns began, "Group 1 shutdown by software initiated" would be displayed. Also, if a request to reboot the UPS 10 is made by a NMC, before the timed countdown began, "UPS reboot by NMC started" would be displayed.

In another example, after the requested state changes have been completed, the information regarding the source and manner of the request, displayed before the timed countdowns started, is displayed again on the user interface 30. For example, if a request to turn off the UPS 10 is made by a user through the user interface 30, "UPS turned off by user" would be displayed. Also, if a request to turn off the UPS is made by the controller 16 of the UPS 10 as a result of an error, "UPS turn off by fault" would be displayed.

Also, in other examples in which the UPS 10 has been powered off, the information regarding the source and manner of the request may be available to view on the user interface 30 until the UPS 10 is powered up again. In one example, after a certain amount of time has elapsed, the information regarding the source and manner of the request is removed from the user interface 30; however, responsive to a user pressing any one of the buttons on the user interface 30 except the power button 40, the information regarding the source and manner of the request is displayed again.

In one example, once the UPS 10 is completely turned off, it may only be powered up again by a user pressing the power button 40. In another example, the UPS 10 may be powered up again by a request from any one of the sources previously discussed.

In another example, the turn UPS off screen 390 may be transitioned to immediately upon a user pressing the power button 40. In one example, a continued pressing of the power button 40 in response to inquiries on the user interface 30 will automatically select a default or recommended decision in response to the inquiries. In another example, in response to the power button 40 being held down, no inquiries will be asked of the user and the UPS 10 will automatically begin to power down.

Figure 4:
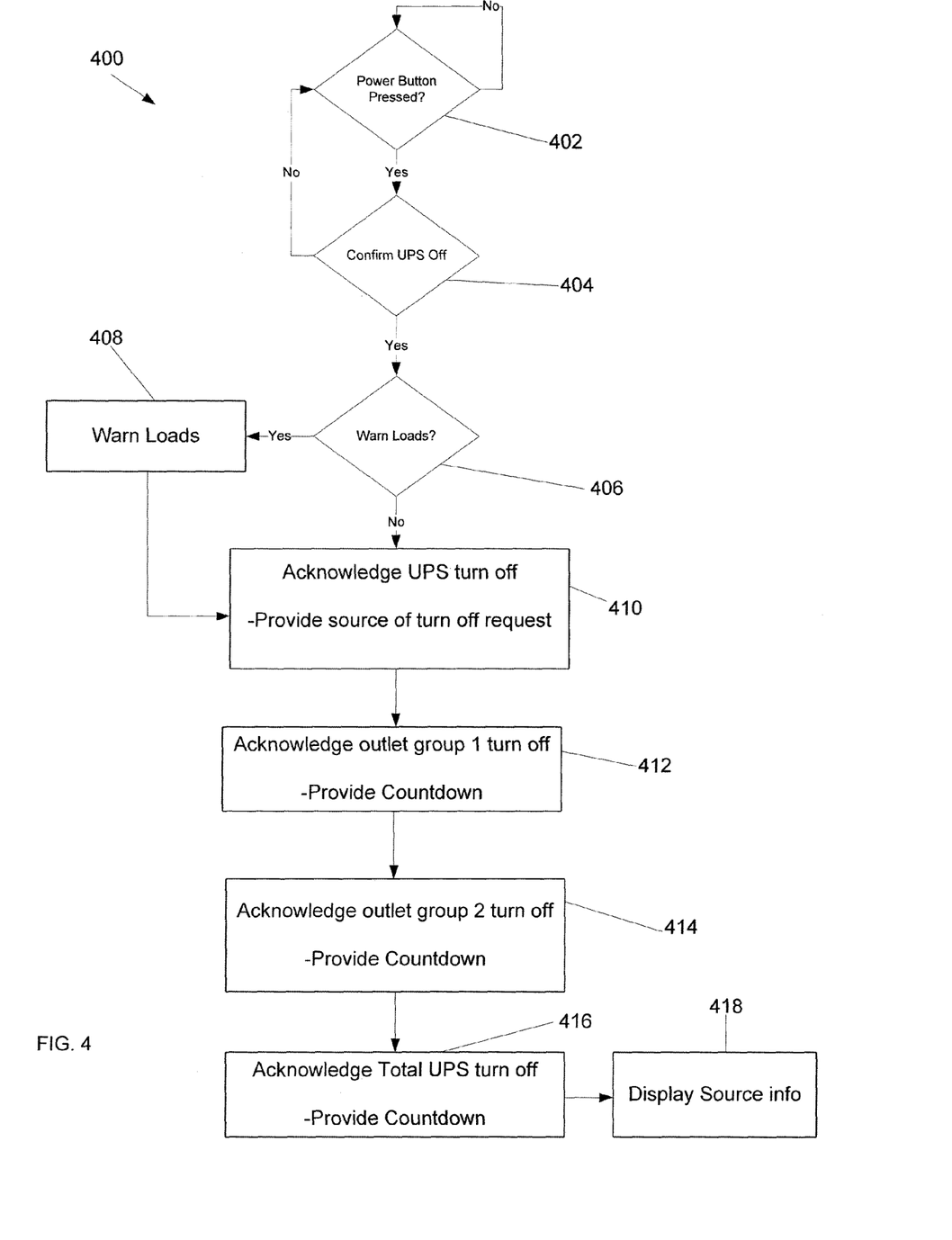
FIG. 4 is a process diagram of a process for changing power states in a UPS in accordance with the present invention.

In reference to FIG. 4, the operation of the UPS 10 with regard to the pressing of the power button 40 will now be described. At block 402, the power button 40 is pressed by a user. At block 404, the user either selects "yes" to confirm the turn off request, or "no" to cancel the turn off request. At block 406, the user either selects "yes" to warn connecting loads of the impending turn off process, or "no" not to warn connecting loads of the impending turn off process. At block 408, responsive to a "yes" selection at block 406, the loads are warned of the impending turn off process. At block 410, either responsive to a "no" selection at block 406 or after the loads were warned at block 408, the UPS turn off is acknowledged on the user interface 30 along with state change request source information. In this example, the user interface 30 would display "UPS turned off by user." At block 412, a first outlet group is powered down after the expiration of a first timer. At block 414, a second outlet group is powered down after the expiration of a second timer. At block 416, the UPS 10 is completely powered down after the expiration of a final timer. At block 428, the state change request source information is displayed on the user interface 30. In this example, "UPS turned off by user" would be displayed.

In one example, information regarding a change of state request (e.g. type of state change, source of request, and time of request) may be logged for future use. For example, as shown in FIG. 3, the log screens that are accessible via the logs screen 312 provide access to historical performance information related to the UPS 10. In one example, the historical performance information may include state change request source information (e.g. by software, NMC, user, UPS). In another example, the historical performance information may include types of state changes (e.g. turn off, shutdown, reboot) that have been requested. In another example, the historical performance information may include times at which state change requests were made. According to the example shown in FIG. 3, once the logs screen 312 is selected via the enter button 56, the user can navigate to screens 381 and 383 using the scroll up button 52 and the scroll down button 54. The transfer log screen 381 displays the reason for the last ten transfers of power from on-line power to on-battery power. The fault log screen 383 displays the reason for the last ten instances when the UPS 10 was powered down. It should be appreciated that the log screens accessible via the logs screen 312 are not limited to a transfer log screen and a fault log screen and may be configured to display any historical performance information that has been previously saved.

It should be appreciated that the interface structure 300 may include a different configuration of screens used to operate the UPS. It should also be appreciated that blocks of method 400 may be performed in a different order than that depicted in FIG. 4, as the present invention is not limited to the specific order shown in FIG. 4.

Having thus described several aspects of at least one example of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of monitoring a power state of an uninterruptible power supply, the uninterruptible power supply including non-volatile data storage, a first interface, and a second interface, the method comprising:

providing, by the uninterruptible power supply, uninterruptible power to a load separate from and external to the uninterruptible power supply;

receiving, via the first interface from a first source of a plurality of sources, a first request to directly change the power state of the uninterruptible power supply;

initiating, by the uninterruptible power supply, a first change of power state based on the first request, the first change of power state having a first type;

changing, by the uninterruptible power supply, the uninterruptible power provided to the load in accord with the first change of power state;

logging, by the uninterruptible power supply, a first identity of the first source, the first type, and a time of the first change of power state, wherein logging the first identity includes saving the first identity within historical performance information stored in the non-volatile data storage;

receiving, via the second interface from a second source of the plurality of sources, a second request to directly change the power state of the uninterruptible power supply;

initiating, by the uninterruptible power supply, a second change of power state based on the second request, the second change of power state having a second type;

changing, by the uninterruptible power supply, the uninterruptible power provided to the load in accord with the second change of power state; and logging, by the uninterruptible power supply, a second identity of the second source, the second type, and a time of the second change of power state, wherein logging the second identity includes saving the second identity within the historical performance information.

2. The method of claim 1, further comprising providing access to the historical performance information via the first interface.

3. The method of claim 2, wherein providing access to the historical performance information via the first interface includes providing access to the historical performance information via a user interface.

4. The method of claim 3, wherein providing access to the historical performance information via the user interface includes providing access to the historical information via an alphanumeric user interface.

5. The method of claim 2, wherein providing access to the historical performance information via the first interface includes providing access to the historical performance information via a system interface.

6. The method of claim 1, wherein initiating the first change of power state includes communicating through the first interface the first request to directly change the power state and the first identity.

7. The method of claim 1, wherein initiating the first change of power state includes initiating a shutdown of an outlet of the uninterruptible power supply.

8. The method of claim 1, wherein initiating the first change of power state includes initiating a powering off of the uninterruptible power supply.

9. The method of claim 1, wherein initiating the first change of power state includes initiating a sleep mode of the uninterruptible power supply.

10. The method of claim 1, wherein initiating the first change of power state includes initiating a reboot of the uninterruptible power supply.

11. The method of claim 1, wherein initiating the first change of power state includes initiating a reboot of an outlet of the uninterruptible power supply.

12. The method of claim 1, wherein initiating the first change of power state includes initiating a gradual shutdown of loads attached to the uninterruptible power supply.

13. The method of claim 1, further comprising communicating through the first interface the first type.

14. The method of claim 1, further comprising communicating through the first interface the time of the first change of power state.

15. The method of claim 1, further comprising communicating a warning to a load impacted by the first change of power state.

16. The method of claim 1, wherein initiating the first change of power state includes:
powering off at least one group of outlets of the uninterruptible power supply after a first time period has elapsed; and
powering off the uninterruptible power supply after a second time period has elapsed.

17. The method of claim 1, wherein each of the plurality of sources is configured to request changes to the power state of the uninterruptible power supply and the method further comprises receiving, from a different source of the plurality of sources, a different request to directly change the power state of the uninterruptible power supply, the different source, the first source and the second source being different sources, the different request, the first request and the second request being different requests.

18. The method of claim 1, further comprising displaying the first identity and the second identity via the first interface on the uninterruptible power supply.

19. An uninterruptible power supply comprising:
a housing;
an input to receive power from a power source;
a backup power source;
an output operatively coupled to the input and the backup power source to provide uninterruptible power to a load separate from and external to the uninterruptible power supply, the uninterruptible power supply being configured to provide the uninterruptible power from at least one of the power source and the backup power source;
a non-volatile data storage;
a first interface configured to receive, from a first source of a plurality of sources, a first request to directly change a power state of the uninterruptible power supply;
a second interface configured to receive, from a second source of the plurality of sources, a second request to directly change the power state of the uninterruptible power supply; and
a controller coupled to the non-volatile data storage, the first interface, and the second interface and configured to:
receive the first request via the first interface;
initiate a first change of power state based on the first request, the first change of power state having a first type;
change the uninterruptible power provided to the load in accord with the first change of power state;
log a first identity of the first source, the first type, and a time of the first change of power state within historical performance information stored within the non-volatile data storage;
receive the second request via the second interface;
initiate a second change of power state based on the second request, the second change of power state having a second type;
change the uninterruptible power provided to the load in accord with the second change of power state; and
log a second identity of the second source, the second type, and a time of the second change of power state within the historical performance information.

20. The uninterruptible power supply of claim 19, wherein the controller is further configured to provide access to the historical performance information via the first interface.

21. The uninterruptible power supply of claim 19, wherein the first interface and the second interface are disposed within the housing.

22. The uninterruptible power supply of claim 19, wherein the first interface includes a user interface.

23. The uninterruptible power supply of claim 22, wherein the user interface is an alphanumeric user interface.

24. The uninterruptible power supply of claim 19, wherein the first interface includes an application program interface.

25. The uninterruptible power supply of claim 19, wherein in initiating the first change of power state based on the first request, the controller is further configured to communicate, through the first interface, the first request to directly change the power state and the first identity.

26. The uninterruptible power supply of claim 19, wherein in initiating the first change of power state, the controller is further configured to initiate a shutdown of an outlet of the uninterruptible power supply.

27. The uninterruptible power supply of claim 19, wherein in initiating the first change of power state, the controller is further configured to initiate a powering off of the uninterruptible power supply.

28. The uninterruptible power supply of claim 19, wherein in initiating the first change of power state, the controller is further configured to initiate a sleep mode of the uninterruptible power supply.

29. The uninterruptible power supply of claim 19, wherein in initiating the first change of power state, the controller is further configured to initiate a reboot of the uninterruptible power supply.

30. The uninterruptible power supply of claim 19, wherein in initiating the first change of power state, the controller is further configured to initiate a reboot of an outlet of the uninterruptible power supply.

31. The uninterruptible power supply of claim 19, wherein in initiating the first change of power state, the controller is further configured to initiate a gradual shutdown of loads attached to the uninterruptible power supply.

32. The uninterruptible power supply of claim 19, wherein the controller is further configured to communicate through the first interface the first type.

33. The uninterruptible power supply of claim 19, wherein the controller is further configured to communicate through the first interface the time of the first change of power state.

34. The uninterruptible power supply of claim 19, wherein the controller is further configured to communicate a warning to a load impacted by the first change of power state.

35. The uninterruptible power supply of claim 19, wherein in initiating the first change of power state, the controller is further configured to:
power off at least one group of outlets of the uninterruptible power supply after a first time period has elapsed; and
power off the uninterruptible power supply after a second time period has elapsed.

36. The uninterruptible power supply of claim 19, further comprising a second input to receive power from a second power source.

37. The uninterruptible power supply of claim 36, wherein the second power source is a battery.

38. The uninterruptible power supply of claim 37, wherein the battery is included in the uninterruptible power supply.

39. The uninterruptible power supply of claim 19, wherein the controller is further configured to receive, from a different source of the plurality of sources, a different request to directly change the power state of the uninterruptible power supply, the different source, the first source and the second source being different sources, the different request, the first request and the second request being different requests.

40. The uninterruptible power supply of claim 19, wherein the controller is further configured to display the first identity and the second identity via the first interface.

41. A non-transitory computer readable medium having stored thereon sequences of instruction for monitoring a power state of an uninterruptible power supply including instructions that instruct at least one processor of the uninterruptible power supply to:
provide, by the uninterruptible power supply, uninterruptible power to a load separate from and external to the uninterruptible power supply;
receive, via a first interface from a first source of a plurality of sources, a first request to directly change the power state of the uninterruptible power supply;
initiate, by the uninterruptible power supply, a first change of power state based on the first request, the first change of power state having a first type;
change, by the uninterruptible power supply, the uninterruptible power provided to the load in accord with the first change of power state;
log, by the uninterruptible power supply, a first identity of the first source, the first type, and a time of the first change of power state within historical performance information stored in the non-volatile data storage;
receive, via a second interface from a second source of the plurality of sources, a second request to directly change the power state of the uninterruptible power supply;
initiate, by the uninterruptible power supply, a second change of power state based on the second request, the second change of power state having a second type;
changing, by the uninterruptible power supply, the uninterruptible power provided to the load in accord with the second change of power state; and
log, by the uninterruptible power supply, a second identity of the second source, the second type, and a time of the second change of power state within the historical performance information.

42. The computer readable medium of claim 41, wherein the sequences of instruction include instructions that will further cause the at least one processor to provide access to the historical performance information via the first interface.

43. The computer readable medium of claim 42, wherein the sequences of instruction include instructions that will further cause the at least one processor to provide access to the historical performance information by providing access to the first identity and the second identity via the first interface.

44. The computer readable medium of claim 41, wherein the sequences of instruction include instructions that will further cause the at least one processor to provide access to the historical performance information by providing access to the first type and the second type via the first interface.

45. The computer readable medium of claim 41, wherein the sequences of instruction include instructions that will further cause the at least one processor to communicate with a user via the first interface.

46. The computer readable medium of claim 41, wherein the sequences of instruction include instructions that will further cause the at least one processor to communicate with a system via the first interface.

* * * * *